(12) United States Patent
Kim

(10) Patent No.: US 6,572,180 B2
(45) Date of Patent: Jun. 3, 2003

(54) COWL SIDE PART STRUCTURE OF VEHICLE

(75) Inventor: Ki-Chang Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/989,546

(22) Filed: Nov. 21, 2001

(65) Prior Publication Data

US 2002/0063444 A1 May 30, 2002

(30) Foreign Application Priority Data

Nov. 24, 2000 (KR) ........................................ 2000-70277

(51) Int. Cl.[7] ............................................... B60R 27/00
(52) U.S. Cl. .................. 296/203.02; 296/194; 296/188
(58) Field of Search ................................ 296/192, 194, 296/203.02, 188

(56) References Cited

U.S. PATENT DOCUMENTS

| | | | | |
|---|---|---|---|---|
| 4,078,840 A | * | 3/1978 | Itoh ............................ 296/192 |
| 4,270,793 A | * | 6/1981 | Harasaki et al. ............ 296/192 |
| 4,545,612 A | * | 10/1985 | Harasaki ..................... 296/194 |
| 4,669,776 A | * | 6/1987 | Harasaki ..................... 296/194 |
| 4,669,777 A | * | 6/1987 | Harasaki et al. ............ 296/194 |
| 4,699,419 A | * | 10/1987 | Kawase et al. .............. 296/194 |
| 4,717,198 A | * | 1/1988 | Komatsu ..................... 296/194 |
| 4,723,811 A | * | 2/1988 | Harasaki ..................... 296/194 |
| 4,886,314 A | * | 12/1989 | Maeda ........................ 296/194 |
| 5,011,201 A | * | 4/1991 | Takahashi et al. ........... 296/194 |
| 5,102,164 A | * | 4/1992 | Fujinaka et al. ............. 296/194 |
| 5,586,799 A | * | 12/1996 | Kanemitsu et al. .......... 296/188 |
| 6,209,950 B1 | * | 4/2001 | Hanyu ......................... 296/194 |
| 6,322,124 B1 | * | 11/2001 | Kim ............................. 296/186 |
| 6,332,642 B1 | * | 12/2001 | Hanyu .................... 296/203.02 |

FOREIGN PATENT DOCUMENTS

| | | | | |
|---|---|---|---|---|
| JP | 1-215679 | * | 8/1989 | ................. 296/194 |
| JP | 6-144294 | * | 5/1994 | ................. 296/194 |
| JP | 6247341 | * | 9/1994 | ................. 296/194 |

* cited by examiner

Primary Examiner—D. Glenn Dayoan
Assistant Examiner—H. Gutman
(74) Attorney, Agent, or Firm—Birch, Stewart, Kolasch & Birch, LLP

(57) ABSTRACT

A cowl side part structure of vehicle for coping with impact transmitted from sides of the vehicle, the structure has: a box extension of closed section integrally formed in a T shape with a vertical column part of side outer; a first flange mounted at a tip end of the box extension; and a fender apron upper formed with a second flange corresponding to the first flange of the box extension, where the first flange of the body extension and the second flange of the fender apron upper are welded for coupling therebetween.

3 Claims, 4 Drawing Sheets

COWL SIDE PART STRUCTURE OF VEHICLE

BACKGROUND OF THE INVENTION

1. Field of the Invention

The present invention relates to an increased rigidity structure of a vehicle for coping with impact transferred from sides of the vehicle, and more particularly to a cowl side part structure of a vehicle adapted to improve a coupled structure of side outer, fender apron upper, cowl side outer and the like that constitute a cowl side structure.

2. Description of the Prior Art

In general, a vehicle is equipped at a front thereof with a cowl box structure which divides an engine room from an interior for maintaining a structural rigidity of the vehicle.

FIG. 1 is an exploded view drawing for illustrating a formation of a cowl side according to the prior art, where a cowl top 100, a side outer 102, a fender apron upper 104 and a cowl side outer 106 are coupled to form a cowl side 108 shown in the center, while FIG. 2 illustrates a sectional view of the cowl side thus coupled.

By way of reference, FIG. 2 also illustrates a vertical column part 102-1 of the side outer 102 coupled by a door 110 via a door hinge assembly 112.

Now, a cowl side structure of a vehicle will be described with reference to FIGS. 1 and 2.

The structure is formed such that the side outer 102 is connected at an interior side thereof with a cowl top 100 while the side outer 102 is assembled at the exterior side thereof by a fender apron upper 104 to which the cowl side outer 106 is welded.

At this location, the vertical column part 102-1 of the side outer 102 has a shape of a pillar forming a closed sectional view while the fender apron upper 104 and the cowl side outer 106 are connected to the pillar-shaped vertical column part 102-1 in a cantilever way, where the connection is completed by way welding stops (W) indicated in circles in FIG. 1.

However, there is a problem in a vehicle body having the structure thus described in that there occur cracks at welded parts (W) where the fender apron upper 104 and the cowl side outer 106 are coupled to the vertical column part 102-1 of the side outer 102.

There are other problems in that deteriorated state of noise, vibration and harshness (NVH) occur due to twisting and bending phenomenon generated by insufficient rigidity at the welded parts (W).

SUMMARY OF THE INVENTION

The present invention solves the aforementioned problems and it is an object of the present invention to provide a cowl side part structure of a vehicle constructed to increase strength at welded parts where a vertical column part of a side outer in joined by a fender apron upper and cowl side outer to restrain generation of cracks, to minimize bends and twists and to thereby improve deteriorated states of noise, vibration and harshness (NVH).

In accordance with the objects of the present invention, there is provided a cowl side part structure of a vehicle, the structure comprising:

a box extension of a closed section integrally formed in T shape at a vertical column part of a side outer;

a first flange mounted at a tip end of the box extension; and a fender apron upper formed with a second flange corresponding to the first flange of the box extension, where the first flange of the body extension and the second flange of the fender apron upper are welded for coupling therebetween.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Now, structure and operation of the present invention will be described in detail with reference to the accompanying drawings.

Figure 1:
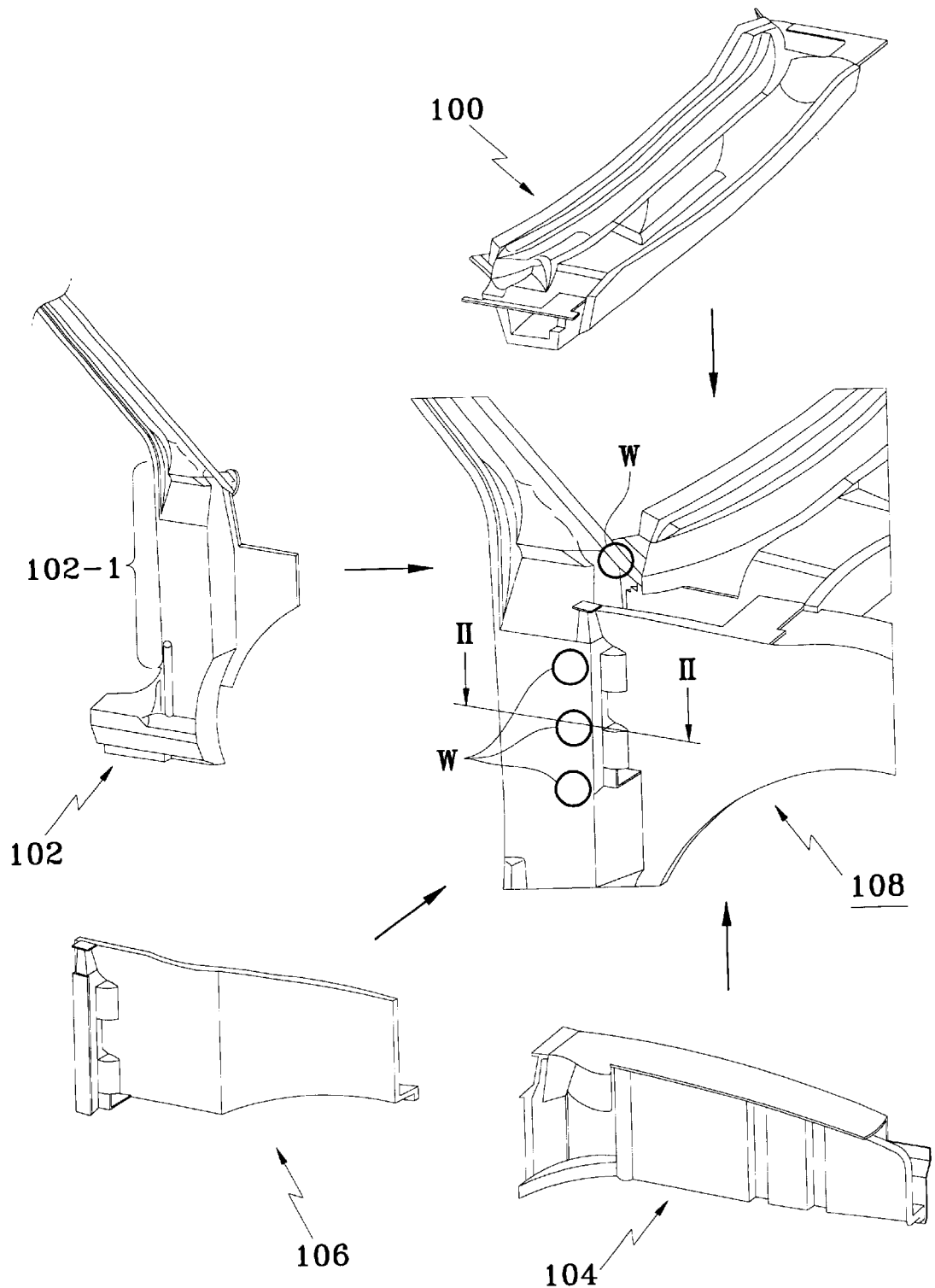
FIG. 1 is an exploded view drawing for coupling of a cowl side according to the prior art.
Figure 2:
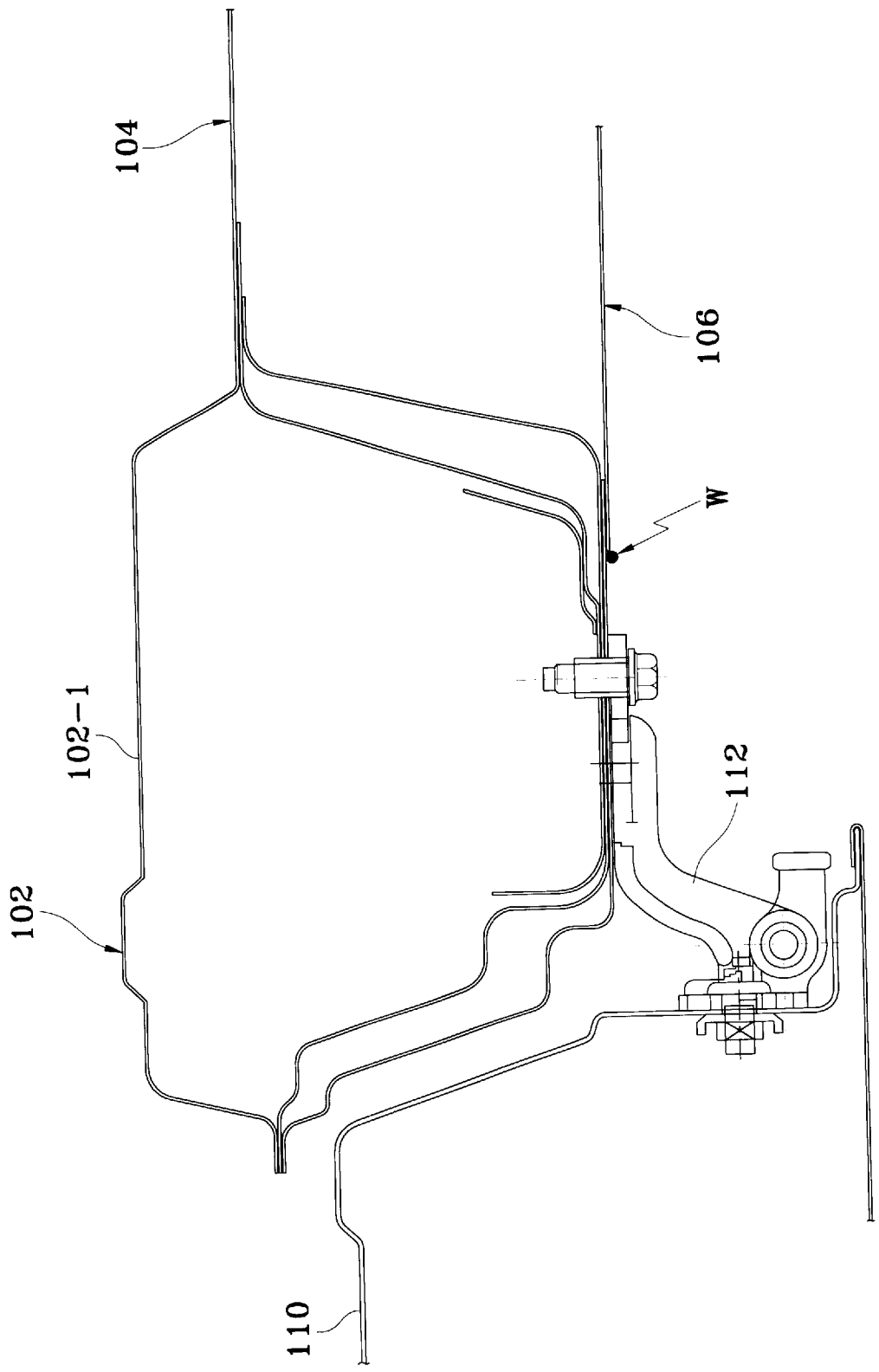
FIG. 2 is a sectional view taken along line II—II of FIG. 1.
Figure 3:
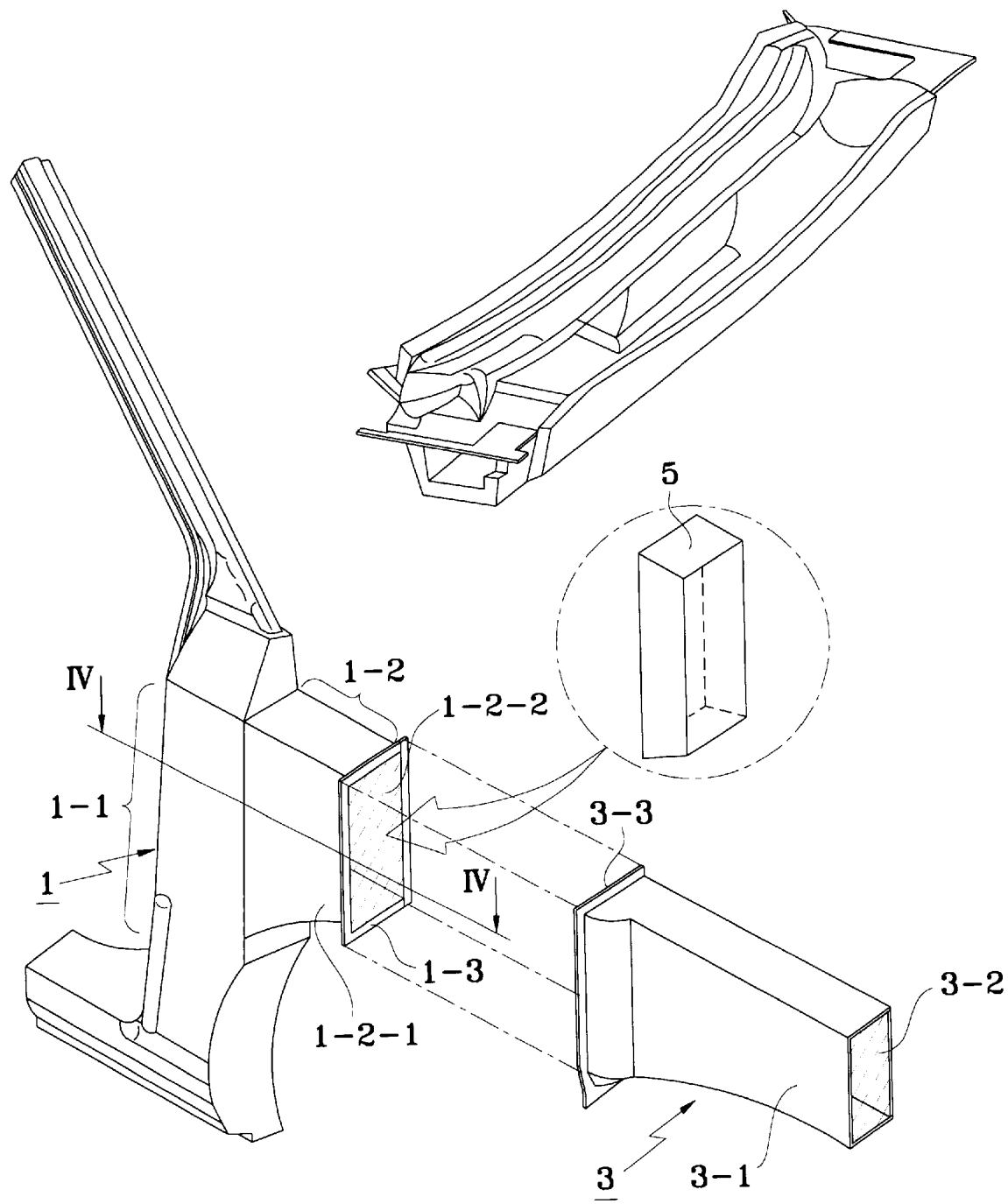
FIG. 3 is an exploded perspective view for illustrating cowl side part structure of vehicle according to the present invention.
Figure 4:
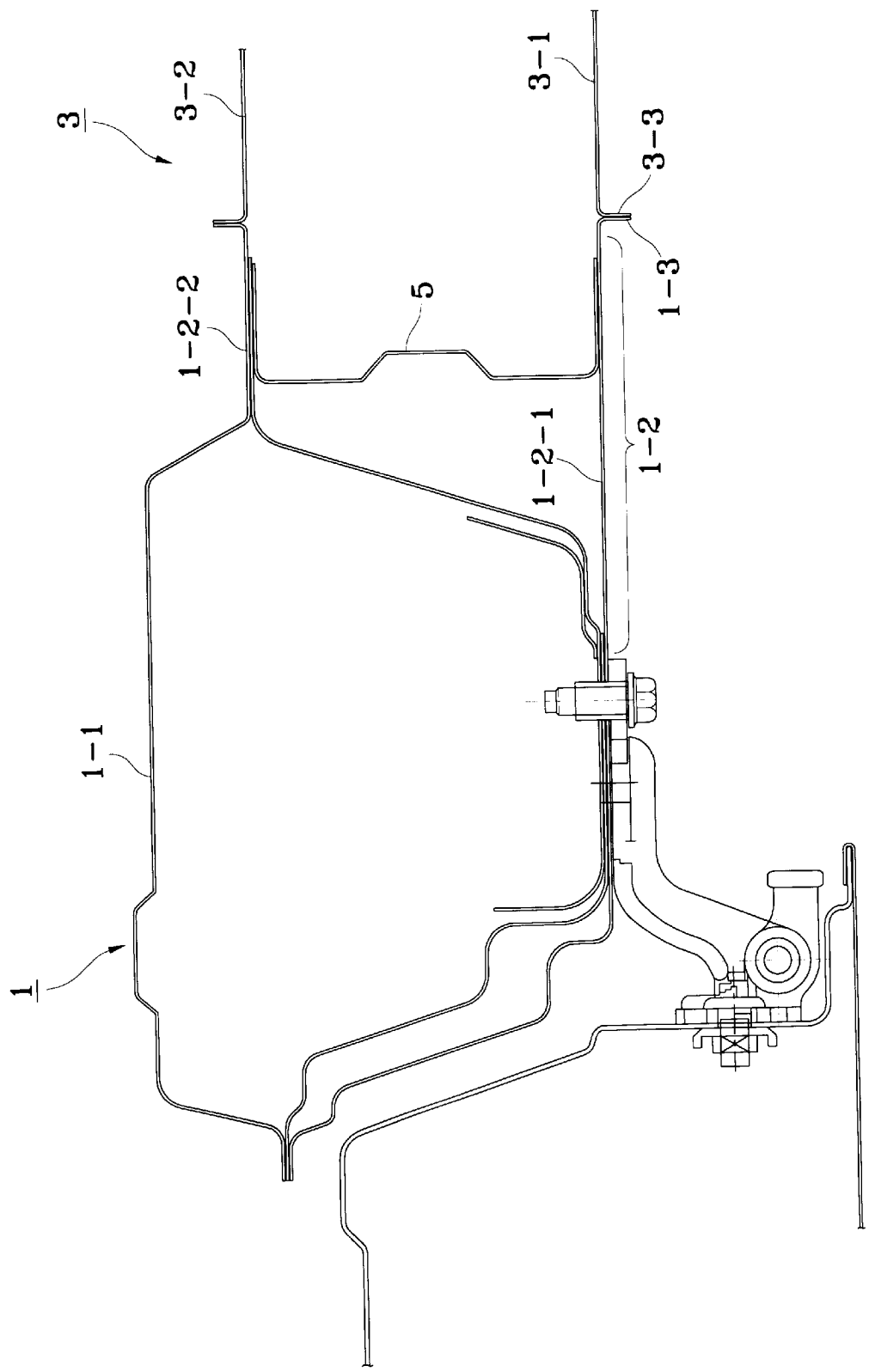
FIG. 4 is a sectional view taken along line IV—IV of FIG. 3 when the structure is coupled.

FIG. 3 is an exploded perspective view for illustrating a cowl side part structure of a vehicle according to the present invention and FIG. 4 is a sectional view taken along line IV—IV of FIG. 3 when the structure is coupled together.

The vertical column part 1-1 of the side outer 1 is mounted with a protruding box extension 1-2 integrally formed in a T shape with column part 1-1 to form a close section where, in the present embodiment, formation of the closed section at the box extension 1-2 creates in reality a side inner panel 1-2-2 coupled to an inner side of an extension 1-2-1 of the side outer having a curved profile.

The box extension 1-2 is provided at a tip end thereof with a first flange 1-3 to which a second flange 3-3 mounted at fender apron upper 3 is coupled by welding. The fender apron upper 3 in the present embodiment has a structure where a fender apron upper outer 3-1 comprising an exterior thereof joins a fender apron upper inner 3-2.

In other words, the first flange 1-3 formed at the closed-sectional box extension 1-2 formed by coupling the extension 1-2-1 of the side outer to the side inner panel 1-2-2 is coupled to the second flange 3-3 formed at the fender apron upper, which is formed by coupling the fender apron upper outer 3-1 and the fender apron upper inner 3-2.

At this location, the box extension 1-2 integrally formed at the vertical column part 1-1 is installed therein with a bulkhead 5 having a shape of an opened lid to thereby reinforce strength of the box extension 1-2.

Now, operation of the invention thus constructed will be described.

The box extension 1-2 protrude in a "T" shape from the vertical column part 1-1 of side outer prevents a local stress concentration relative to bending force or twist generated by the fender apron upper 3 connected thereto, thereby embodying a stronger structural coupled state in comparison to the prior art.

In other words, in the prior art, the fender apron upper 104 and the cowl side outer 106 are directly connected to the vertical column part 102-1 in cantelever form, and in the structure of cantelever form, although a maximum stress concentration is generated on the connection part thereof, the connection part is only coupled by several welding spots (W), leading to a generation of cracks thereon an resulting in poor durability.

In contrast, in the present invention, the fender apron upper 3 is connected by the box extension 1-2 of a "T" shape integrally protruded from the vertical column part 1-1 such that the coupled part by way of welding is made to be deviated from stress concentration.

At the same time, the box extension 1-2 thus constructed is integrally connected to the vertical column part 1-1 and protruded in a rather longer shape and is coupled therein by the bulk head 5, thereby dispersing the stress concentration effectively and providing a stronger rigidity thereto for improved durability.

As a result, the box extension 1-2 that provides stronger rigidity thus described is joined by the fender apron upper 3, thereby restraining generation of bending of twisting in relatively effective way, such that various noises and vibrations generated by mutual transformation between neighboring structures can be limited, improving NVH performance of the product.

As apparent from the foregoing, there is an advantage in the cowl side part structure of vehicle thus described according to the present invention in that a vertical column part of a side outer is coupled by a fender apron upper and cowl side outer for improved rigidity, limiting creation of cracks, improving durability, minimizing bends and twists at the coupled parts, and thereby reducing noise, vibration and harshness (NVH) of the vehicle.

There is another advantage in that a box extension integrally provided at the vertical column part is joined by a fender apron upper to thereby reduce a coupling process, instead of coupling the fender apron upper to the vertical column part and again the cowl side outer as in the prior art.

What is claimed is:

1. A cowl side part structure of a vehicle, the structure comprising:

a box extension of a closed section integrally forming a T-shape with a vertical column part of a side outer, said box extension having a first distal end at the vertical column part and a second distal end spaced therefrom along a longitudinal axis of the box extension;

a first flange mounted at the second distal end of the box extension, said first flange being contained in a plane oriented transversely of said longitudinal axis, and defining a first coupling surface; and a fender apron upper formed with a second flange, said second flange also being contained in a plane oriented transversely of said longitudinal axis, and defining a second coupling surface, where the first coupling surface of the first flange of the box extension and the second coupling surface of the second flange of the fender apron upper are secured together.

2. The structure as defined in claim 1, wherein the fender apron upper is formed by coupling a fender apron upper outer forming an exterior thereof and a fender apron upper inner.

3. The structure as defined in claim 1, wherein the box extension integrally formed at the vertical column part is mounted therein with a bulkhead.

* * * * *